United States Patent
Taguchi (10) Patent No.: US 9,692,334 B2
(45) Date of Patent: Jun. 27, 2017

(54) PHASE MANAGEMENT AND POWER SAVING MODE IN AN IMAGE FORMING APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Hiroyuki Taguchi, Shizuoka-ken (JP)

(73) Assignees: TOSHIBA TEC KABUSHIKI KAISHA, Tokyo (JP); KABUSHIKI KAISHA TOSHIBA, Tokyo (JP)

( * ) Notice: Subject to any disclaimer, the term of this patent is extended or adjusted under 35 U.S.C. 154(b) by 154 days.

(21) Appl. No.: 14/135,930

(22) Filed: Dec. 20, 2013

(65) Prior Publication Data

US 2015/0180392 A1    Jun. 25, 2015

(51) Int. Cl.
*H02P 8/12* (2006.01)
*H02P 1/04* (2006.01)
*H04N 1/00* (2006.01)
*B65H 31/34* (2006.01)
*B65H 43/00* (2006.01)

(52) U.S. Cl.
CPC ............... *H02P 8/12* (2013.01); *B65H 31/34* (2013.01); *B65H 43/00* (2013.01); *H02P 1/04* (2013.01); *H04N 1/00891* (2013.01); *B65H 2301/4213* (2013.01); *B65H 2301/4214* (2013.01); *B65H 2801/27* (2013.01)

(58) Field of Classification Search
CPC .......... H02P 8/12; H02P 1/04; H04N 1/00891
USPC ...................................... 358/1.14, 1.15, 412
See application file for complete search history.

(56) References Cited

U.S. PATENT DOCUMENTS

| | | | | |
|---|---|---|---|---|
| 4,476,421 A | * | 10/1984 | Moriguchi ................ | H02P 8/12 318/685 |
| 6,118,945 A | * | 9/2000 | Tanaka .................... | G05B 19/40 318/696 |
| 6,963,415 B1 | * | 11/2005 | Saito ........................ | B41J 11/42 318/696 |
| 7,946,567 B2 | | 5/2011 | Taguchi | |
| 2009/0309904 A1 | * | 12/2009 | Shibasaki .......... | H04N 1/00885 347/1 |

FOREIGN PATENT DOCUMENTS

| JP | 11-275897 | 10/1999 |
|---|---|---|
| JP | 2003-299394 | 10/2003 |

* cited by examiner

*Primary Examiner* — Eric A Rust
(74) *Attorney, Agent, or Firm* — Amin, Turocy & Watson LLP (57) ABSTRACT

A phase management apparatus includes a control section configured to output a first signal for rotating a motor, and output the first signal at a first frequency higher than the frequency which is necessary for rotating the motor when the apparatus resumes from a power-saving mode; a drive circuit configured to store the information relating to the rotation phase of the motor, output a pulse signal to the motor according to the first signal output from the control section, receive the first signal output at the first frequency, and update the information according to the first signal; and a power control section configured to carry out a control of supplying power to the control section but not to the drive circuit in the power-saving mode and supplying power to both the control section and the drive circuit when the apparatus resumes from the power-saving mode.

5 Claims, 8 Drawing Sheets

PHASE MANAGEMENT AND POWER SAVING MODE IN AN IMAGE FORMING APPARATUS

FIELD

Embodiments described herein relate to a technology for managing and controlling the phase of a motor.

BACKGROUND

Conventionally, the phase of a motor is managed and controlled by a motor drive IC (Integrated Circuit), which, when being used, sequentially stores values corresponding to the current phase positions of the motor.

In the case where a motor rotates and moves at predetermined phase positions (herein, set to be '1'-'4' as an example), in order to manage phases of the motor, the motor drive IC stores the current phase positions '1'-'4' in the form of numeric values. The motor drive IC updates the values when outputting a pulse signal to the motor.

When an apparatus provided with a motor and a motor drive IC (hereinafter referred to as a drive IC) for controlling and managing the motor enters a power-saving mode (also called as a sleep mode), the power supply to the drive IC is cut off, and the phase values stored in the drive IC are reset. If the apparatus enters the power-saving mode when the current phase position of the motor is, for example, '2', the phase value of the drive IC is reset to be, for example, an initial value '1' when the apparatus resumes from the power-saving mode. Thus, when the power supply to the drive IC is cut off due to the power-saving mode and the like, the phase value managed by the drive IC is inconsistent with the actual phase position of the motor. In the conventional apparatus, the motor is driven to move to make the phase position thereof to be the initial position '1' so that the phase value managed by the drive IC is consistent with the actual phase position of the motor.

However, time is needed for driving the motor to move. Moreover, the object device gaining power from the rotation of the motor moves as the motor moves. The moving is unnecessary and may cause timing deterioration of the object device. To avoid this situation, a method is proposed according to which the power supply to the drive IC is not cut off, however, this method is not power-saving.

DETAILED DESCRIPTION

The object of the embodiment is to provide a technology for making the phase value managed by a drive IC consistent with the phase position of a motor when the drive IC resumes from a power-saving mode.

In accordance with the embodiment, a phase management apparatus includes a control section, a drive circuit and a power control section. The control section outputs a first signal for rotating a motor, and the control section outputs the first signal at a first frequency higher than the frequency which is necessary for rotating the motor when the apparatus resumes from a power-saving mode. The drive circuit, which is a circuit that stores the information relating to the rotation phase of the motor and outputs a pulse signal to the motor according to the first signal output from the control section, receives the first signal output at the first frequency and updates the information according to the first signal. The power control section carries out a control of supplying power to the control section but not to the drive circuit in a power-saving mode and supplying power to both the control section and the drive circuit when the apparatus resumes from the power-saving mode.

Further, in accordance with the embodiment, a sheet processing apparatus includes alignment plates, a motor, a control section, a drive circuit and a power control section. The alignment plates align a conveyed sheet bundle. The motor controls positions of the alignment plates. The control section outputs a first signal for rotating a motor, and the control section outputs the first signal at a first frequency higher than the frequency which is necessary for rotating the motor when the apparatus resumes from a power-saving mode. The drive circuit, which is a circuit that stores the information relating to the rotation phase of the motor and outputs a pulse signal to the motor according to the first signal output from the control section, receives the first signal output at the first frequency and updates the information according to the first signal. The power control section carries out a control of supplying power to the control section but not to the drive circuit in a power-saving mode and supplying power to both the control section and the drive circuit when the apparatus resumes from the power-saving mode.

In the phase management apparatus according to the embodiment, the phase of the motor is managed not only by the drive IC but also by the control section. The control section supplies power even in the power-saving mode. When resuming from a power-saving mode in which the power supply to the drive IC is cut off, the phase management apparatus adjusts the phase value (information relating to the rotation phase of the motor) of the drive IC to the current phase position of the motor at a high-speed period which is such a level that the motor is not able to follow.

In this way, phases are unified merely by updating the values managed by the drive IC, without making the motor operate. Further, the problem is also avoided that the device operates as powered by the rotation of the motor.

According to the present embodiment, even if the power supply to the drive IC is cut off to save power, a motor may be driven within a time substantially as long as that taken in the case where the power supply to the drive IC is not cut off.

The phase management apparatus described in the embodiment may also be incorporated in an apparatus provided with a motor. In the present embodiment, the incorporation destination apparatus is described as a sheet processing apparatus which is optionally incorporated in an image forming apparatus. The sheet processing apparatus is an apparatus for carrying out stapling processing and folding processing on a bundle of sheets on which images are formed.

Figure 1:
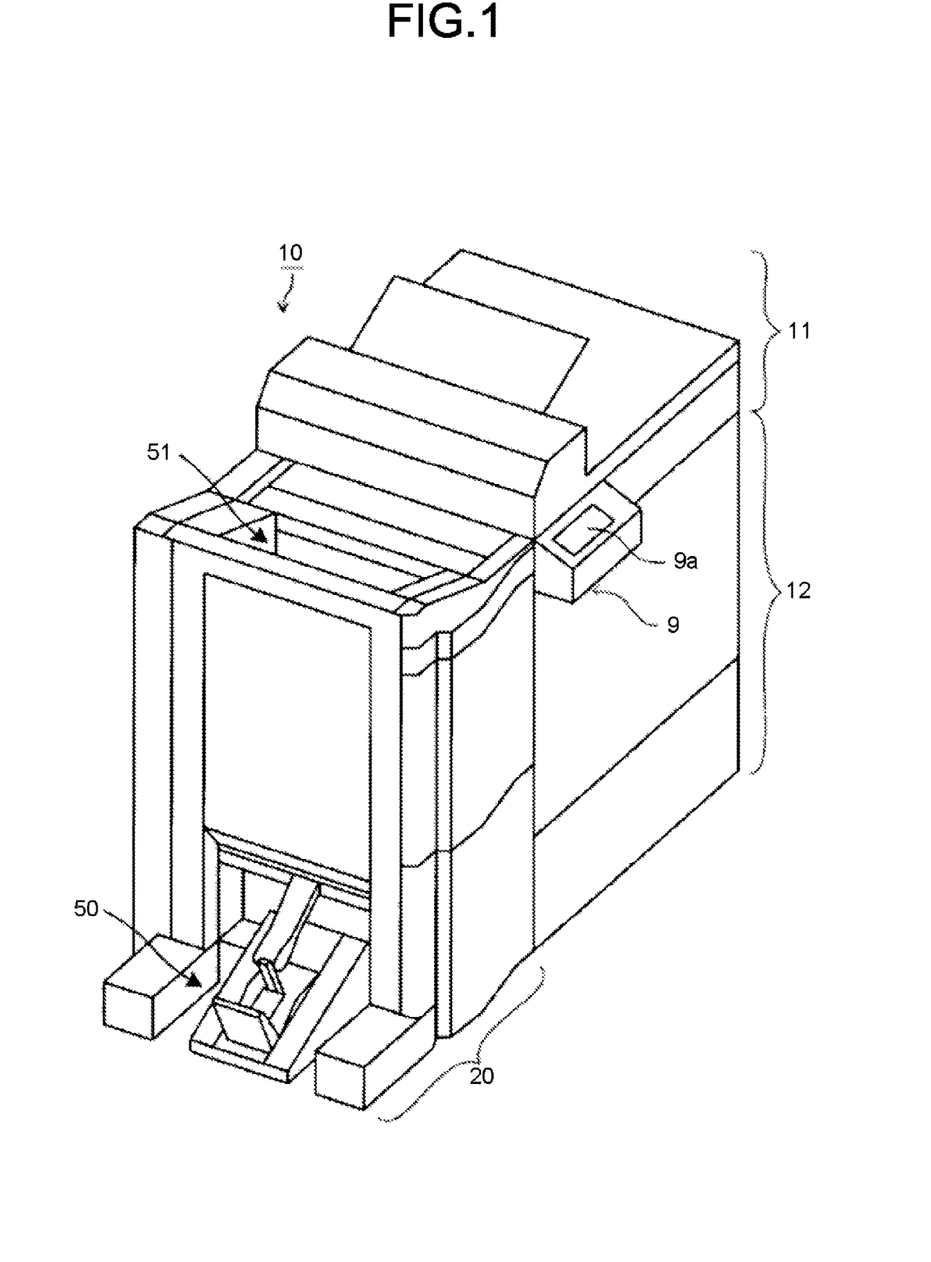
FIG. 1 is a diagram illustrating an example of the appearance of an image forming apparatus and a sheet processing apparatus.

FIG. 1 is a diagram illustrating an example of the appearance of an image forming apparatus and a sheet processing apparatus according to the embodiment. An image forming apparatus 10 comprises a reading section 11 for reading an original; an image forming section 12 for printing the image data of the read original on a sheet in an electrophotography manner; and a sheet processing apparatus 20 for carrying out post-processing such as sorting, punching, folding and binding and the like on the printed sheet. The image forming section 12 comprises a display panel 9a and an operation section 9 for a user to carry out various operations.

Figure 2:
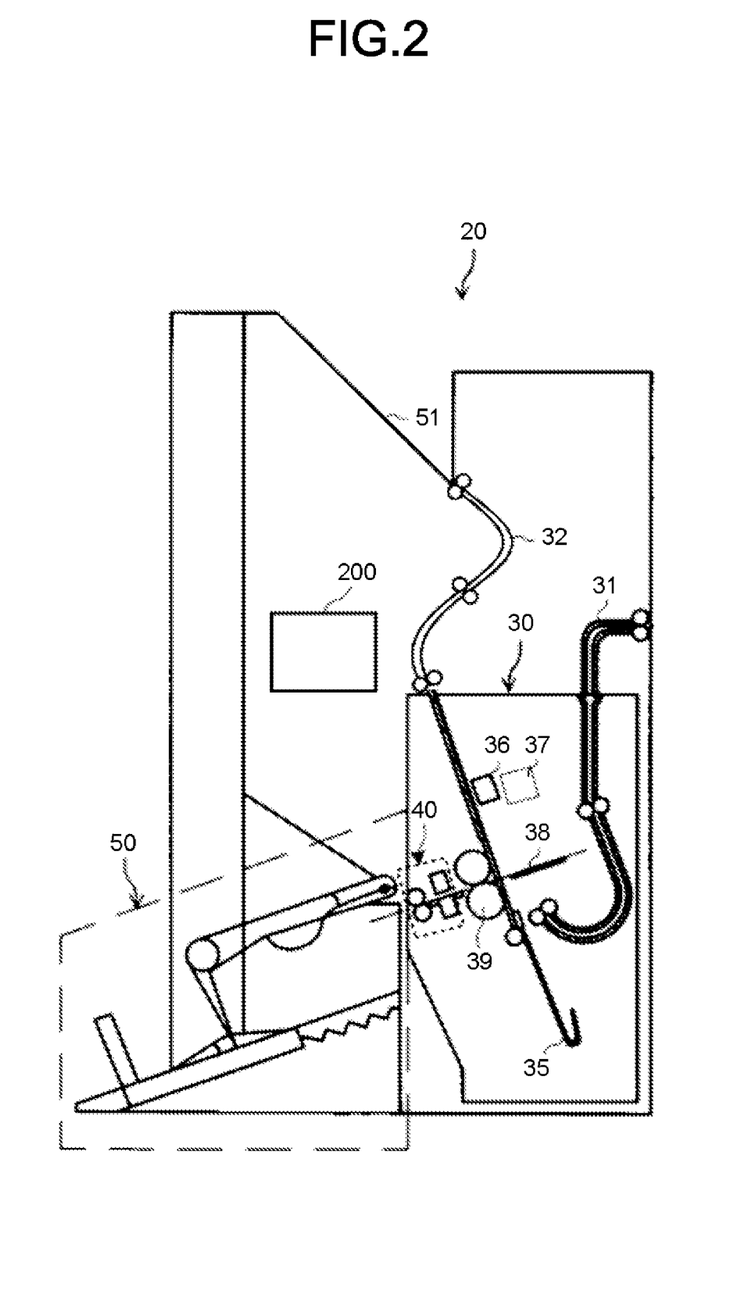
FIG. 2 is a diagram illustrating an example of an internal constitution of a sheet processing apparatus.

FIG. 2 is a diagram illustrating an example of an internal constitution of the sheet processing apparatus 20. In addition to a sorter section for sorting sheets, the sheet processing apparatus 20 further comprises a folding processing section 30, a saddle tray 50 and a discharge tray 51. The sheet processing apparatus 20 further comprises a phase management apparatus 200, which will be described below in detail.

The folding processing section 30 folds a plurality of printed sheets discharged from the image forming section 12 in the middle, and outputs folded and bound booklet to the saddle tray 50. The saddle tray 50 receives the booklets.

The folding processing section 30 comprises a conveyance path 31 for receiving the sheet discharged from the discharging section of the image forming section 12. The conveyance path 31 comprises a plurality of roller pairs and conveys the sheet in the conveyance path to a stacker 35.

The stacker 35 intercepts and aligns lower ends of the sheets output from the conveyance path 31 and falling from the inclined upside after switching back. In this way, the sheet bundle can be aligned in the conveyance direction. When the number of the sheets laminated at the lower end of the stacker 35 reaches a specified number set in a print job, the stacker 35 moves upwards until the lateral side of the sheet bundle is located on the alignment section 36. The alignment section 36 aligns the sheet bundle in the horizontal direction (a direction orthogonal to the conveyance direction of the sheets) of the sheets.

The sheet bundle aligned by the alignment section 36 are stapled by a stapler 37, or folded by a folding blade 38 or a folding roller pair 39.

The folding processing is roughly described below.

1. Control the position (the position in the vertical direction) of the stacker 35 such that the middle of the sheet bundle is positioned at the folding blade 38;

2. The folding blade 38 moves towards the folding roller pair 39. And the sheet bundle is also moved as the folding blade 38 moves.

3. The folding blade 38 continues to move to be inserted between the folding roller pair 39. In this way, the sheet bundle is folded under the pressure of the folding roller pair 39.

The sheet bundle subjected to folding processing is output to the saddle tray 50 by an output mechanism 40. On the other hand, the sheet bundle subjected to stapling processing performed by the stapler 37 is discharged to the discharge tray 51 through the conveyance path 32.

Figure 3:
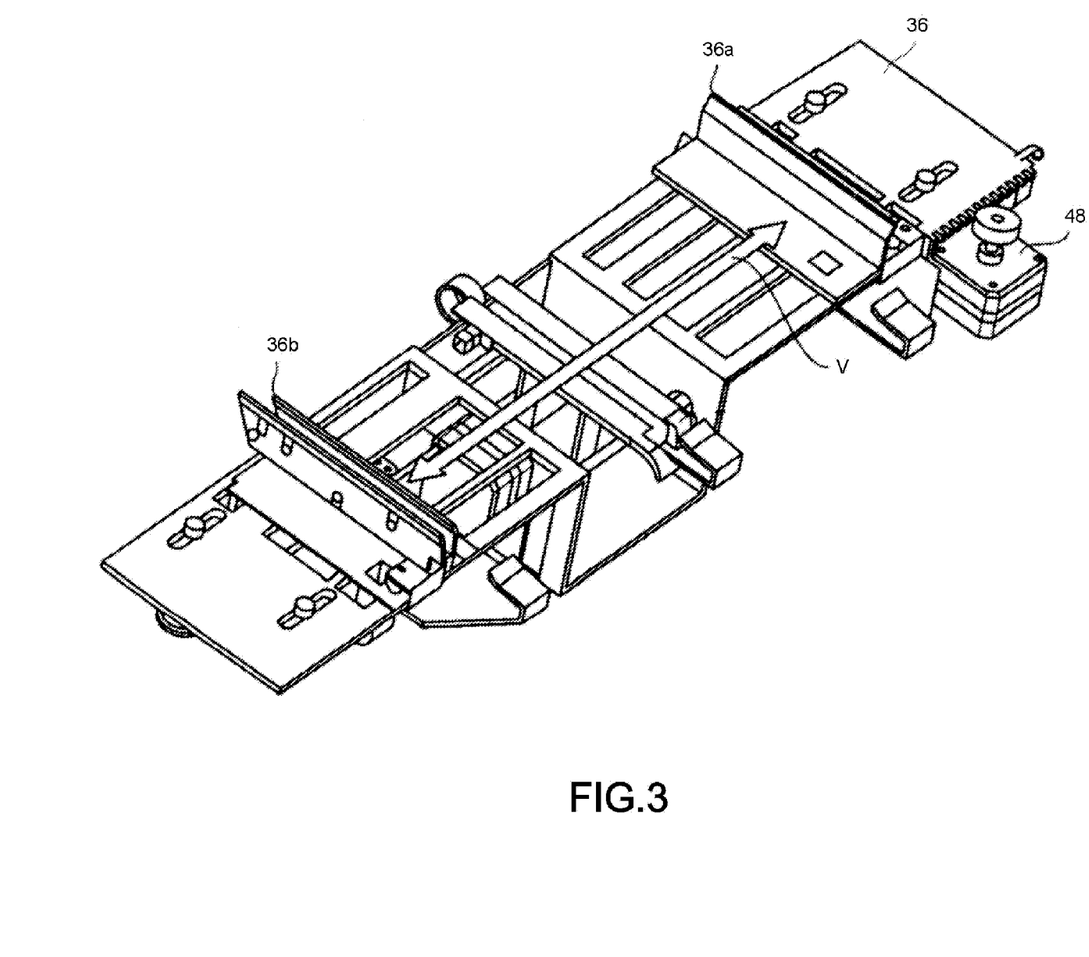
FIG. 3 is a diagram illustrating an example of a constitution nearby an alignment section.

FIG. 3 is a diagram illustrating an example of a constitution nearby the alignment section 36. As shown in FIG. 3, the alignment section 36 comprises alignment plates 36a and 36b, which are driven by the rotation of the motor 48 to slide in a v direction (the direction orthogonal to the conveyance direction of sheets) to align widths of the sheets. Sheet bundle is aligned in the direction orthogonal to the conveyance direction of the sheets through the movement of the alignment plates 36a and 36b.

Figure 4:
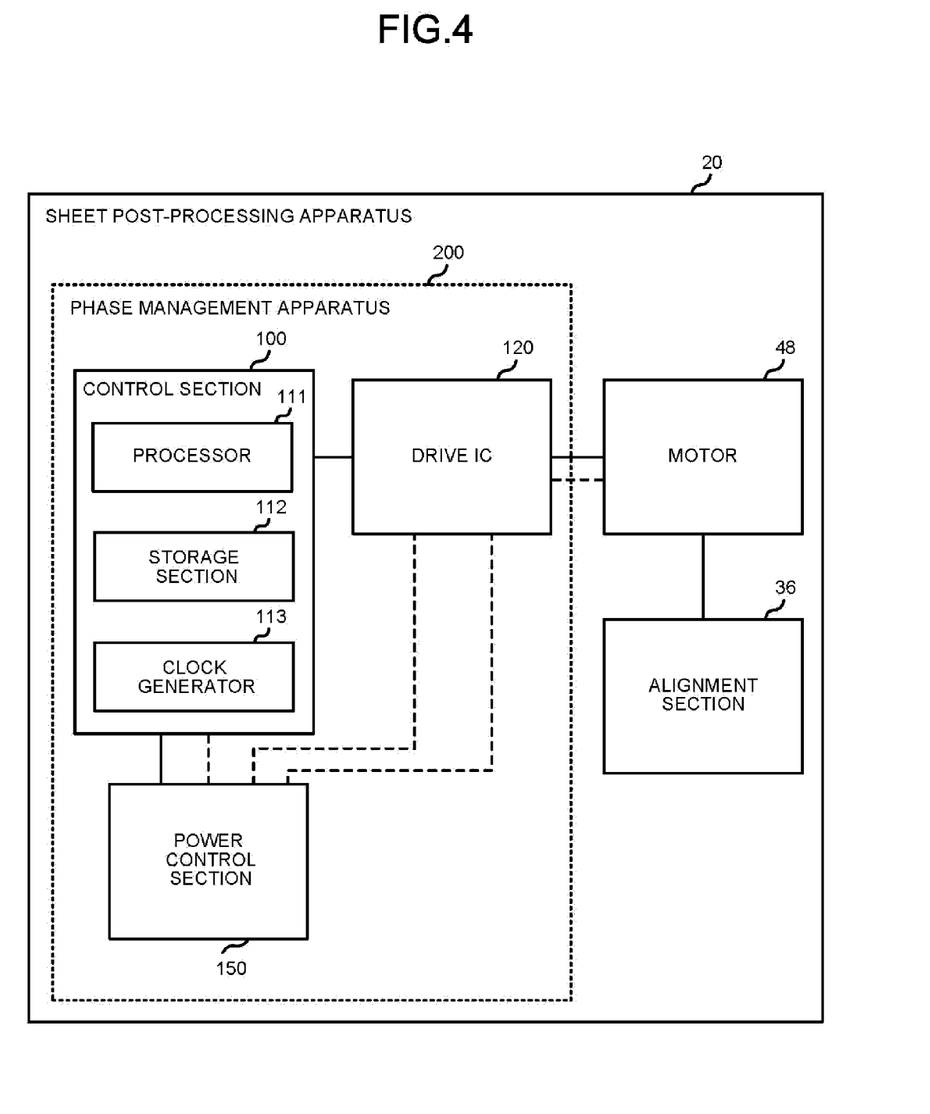
FIG. 4 is a block diagram illustrating an example of a constitution of a sheet processing apparatus according to an embodiment.

FIG. 4 is a block diagram illustrating an example of a constitution of the sheet processing apparatus 20. In FIG. 4, the solid line between each block represents a signal line or a physical connection while the dashed line represents a power supply.

In addition to the aforementioned sections, the sheet processing apparatus 20 further comprises a control section 100, a drive IC 120 and a power control section 150. In the present embodiment, a constitution at least comprising the control section 100, the drive IC 120 and the power control section 150 is set to be the phase management apparatus 200. Further, the phase management apparatus may be of a constitution comprising the motor 48 or the alignment section 36. Further, the function of the control section 100 inside the sheet processing apparatus 20 may be realized by a control section arranged in the main body of the image forming apparatus 10.

The control section 100 comprises a processor 111, a storage section 112 and a clock generator 113. The processor 111, which is, for example, a CPU (Central Processing Unit) or an MPU (Micro Processing Unit), executes the program stored in the storage section 112. Thus, the processor 111 sends an instruction to each unit in the sheet processing apparatus 20. The storage section 112 comprises a RAM (Random Access Memory) serving as a volatile storage apparatus and a ROM (Ream Only Memory) serving as a nonvolatile storage apparatus. The program for a control processing is stored in the ROM in advance, and the processor 111 expands and executes the program in the RAM. The clock generator 113 is a crystal oscillator which generates a base clock for achieving the synchronization in the sheet processing apparatus 20. The control section 100 outputs a signal (the first signal) to the drive IC 120 at a constant period based on the clock generated by the clock generator 113.

The drive IC 120, which is a motor drive IC, outputs a pulse signal for driving the motor 48 to the motor 48 according to the signal output from the control section 100. The drive IC 120 supplies the power gained from the power control section 150 to the motor 48 as a pulse signal. The drive IC 120 has a storage area for storing the values corresponding to phase positions of the motor 48.

The motor 48 is a pulse motor (stepping motor) which is driven to rotate according to the pulse signal from the drive IC 120. The alignment plates 36a and 36b of the alignment section 36 operate by obtaining power from the rotation of the motor 48. Further, the motor 48 and the alignment section 36 may be conventional apparatuses.

The power control section 150 supplies the power gained from a commercial power source to the control section 100 and the drive IC 120. The power control section 150 supplies power to drive the drive IC 120 to the drive IC 120 and supplies power to drive the motor 48 via drive IC 120. It may be also a constitution that the power control section 150 supplies power to the motor 48 directly, instead of supplying power to the motor 48 via drive IC 120. In the power-saving mode, since the power control section 150 cuts off the power supply to the drive IC 120, the motor 48 which gains power via the drive IC 120 and the alignment plates 36a and 36b which operates by obtaining power from the rotation of the motor 48 are stopped due to the cutoff of power supply to the drive IC 120. On the other hand, the power control section 150 supplies power to the control section 100 even in the power-saving mode, thus, the processor 111, the storage section 112 and the clock generator 113 continue operating even in the power-saving mode, and the data stored in the storage section 112 is maintained. Further, the power-saving mode described in the present embodiment is a mode in which the power supply to the control section 100 is continued while at least the power supply to the drive IC 120 is cut off. Further, the power supply to the drive IC 120 resumes when the apparatus resumes from the power-saving mode. It is controlled by the control section 100 to enter the power-saving mode or to resume from the power-saving mode, and the power control section 150 controls power supply according to the instruction from the control section 100.

Generally, a phase value when the main body of the sheet processing apparatus 20 is powered on is determined, and when the sheet processing apparatus 20 in a power off state is powered on, the control section 100 definitely starts a drive control on the motor 48 at the initial value of the phase. For example, if the initial value of the phase is '1' when the power is turned on, in the conventional constitution, the control section 100 outputs information 'phase value is '1'' to the drive IC 120 when the apparatus in a power off state is powered on again. The drive IC 120 sets the phase value to be '1' according to the information and then starts a management operation.

In the present embodiment, at the timing when the sheet processing apparatus 20 is powered on, the control section 100 stores, in the storage section 112, the value (information relating to the rotation phase of the motor, which is '1-4' in this example) output to the drive IC 120. The control section 100 rewrites and updates the value every time the control section 100 outputs the signal of a phase to the drive IC 120. On the other hand, if the power supply to the drive IC 120 and the motor 48 is cut off, for example, when the apparatus enters the power-saving mode, the operation of the drive IC 120 is stopped, thus, the control section 100 cannot output a signal. In this case, the control section 100 conducts no update operation on the value stored in the storage section 112. As a result, the value stored in the storage section 112 is consistent with the current phase position of the motor 48.

After the power supply to the drive IC 120 is cut off to save power or for other sakes, when the apparatus resumes, the control section 100 carries out the following control before the motor 48 is driven again:

1. When the drive IC 120 is powered on and started, the control section 100 compares the initial value with the newest phase value recorded in the storage section 112.

2. If the phases are different, the control section 100 changes the phase value of the drive IC 120 at a high-speed period such a level that the motor 48 is not able to follow until the phases are consistent.

3. When the phase is being changed at the high-speed period in case 2, the current for driving the motor 48 is decreased until a level such that the motor 48 is not driven to operate, thereby completely preventing the rotation of the motor 48.

After the aforementioned processing, a control, which is the same as that carried out in the case where the power supply to the drive IC 120 is continued, is carried out.

Figure 5:
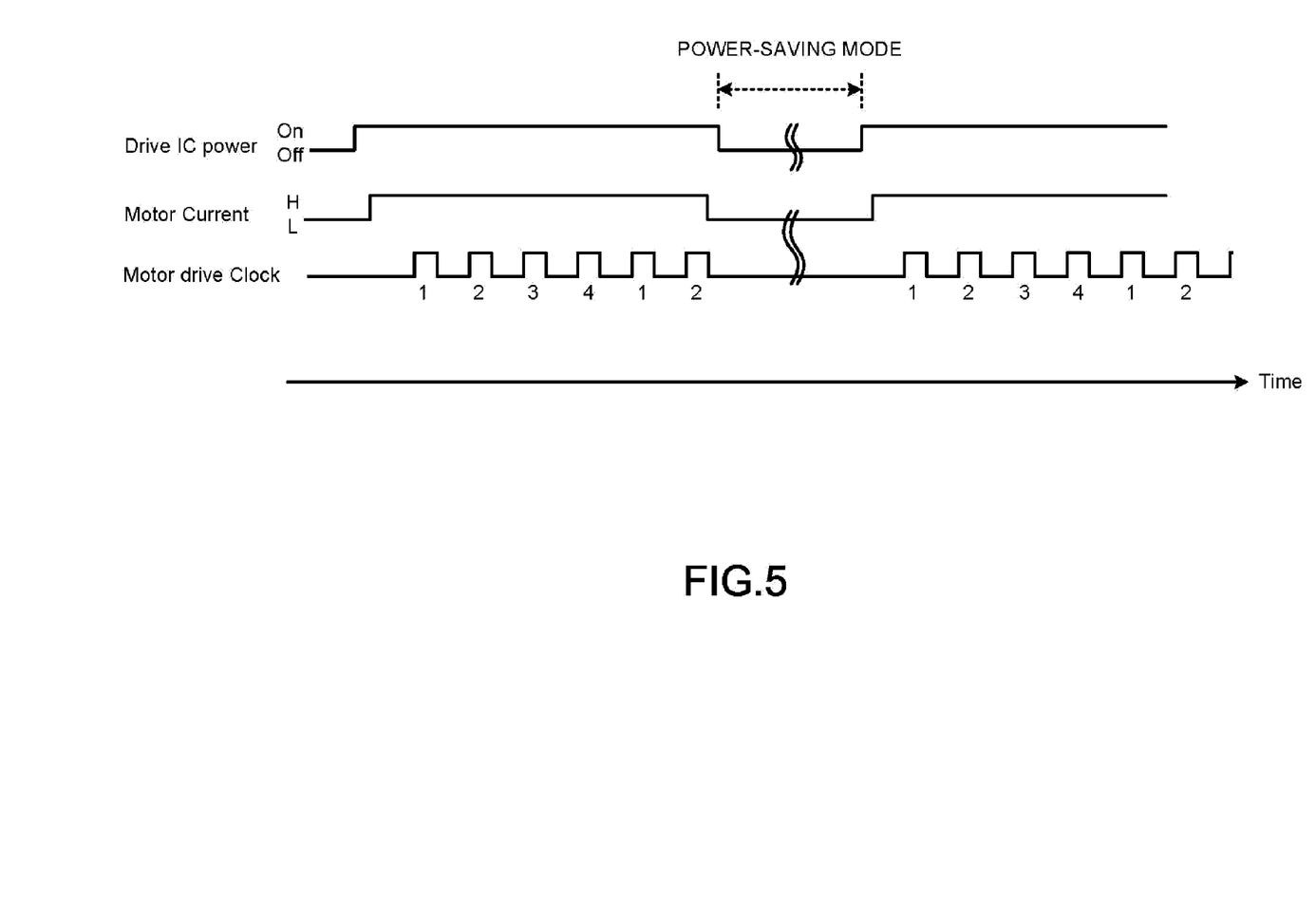
FIG. 5 is a signal timing chart illustrating a conventional control.
Figure 6:
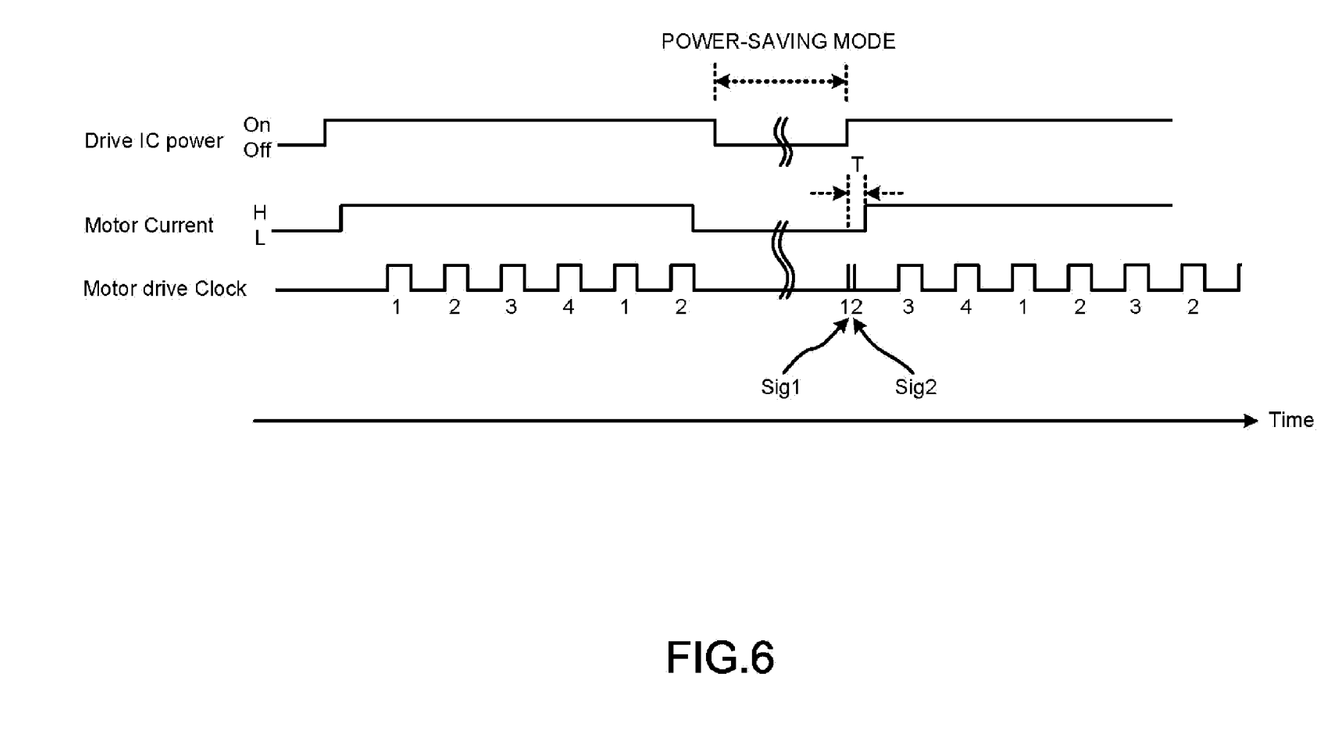
FIG. 6 is a signal timing chart illustrating a control according to an embodiment.

FIG. 5 illustrates a conventional signal timing chart, and FIG. 6 illustrates a signal timing chart when the present embodiment is applied. The abscissa represents time, 'Drive IC power' represents on/off state of power supplied to the drive IC 120, 'Motor Current' represents the strength of the current 'high/low' output to the motor 48, and 'Motor drive Clock' represents the pulse signal output to the motor 48.

When in ordinary operation (in a mode different from the power-saving mode in the example), the control section 100 periodically outputs signals 1-4 to the drive IC 120 at a given interval, and the motor 48 is driven based on the signals. When the power supply to the drive IC 120 is cut off in the power-saving mode, the phase value stored in the drive IC 120 disappears. Thus, in the conventional apparatus, as shown in FIG. 5, when the power supply resumes, the motor is driven from the initial state (the initial value: pulse signal 1) of the drive IC 120 since the stop state of the motor is unknown.

In the present embodiment, as shown in FIG. 6, the control section 100 outputs signals at a high-speed period which is such a level that the motor 48 is not able to follow so as not to drive the motor 48, that is, Sig1 and Sig2 in the example shown in FIG. 6. The drive IC 120 rewrites phase value thereof after receiving the Sig1 and the Sig2. The power control section 150 restricts the power supply to the motor 48 to decrease the current such that the motor 48 is not driven to operate when the phase value is being rewritten (Time T shown in FIG. 6) according to an instruction from the control section 100. In this way, by outputting signals at a high speed and decreasing the current, the motor 48 is not driven until the phase value in the drive IC 120 is consistent with the current phase position of the motor 48. By means of the control, the motor 48 can be driven from the phase position where the motor 48 stops the last time.

Figure 7:
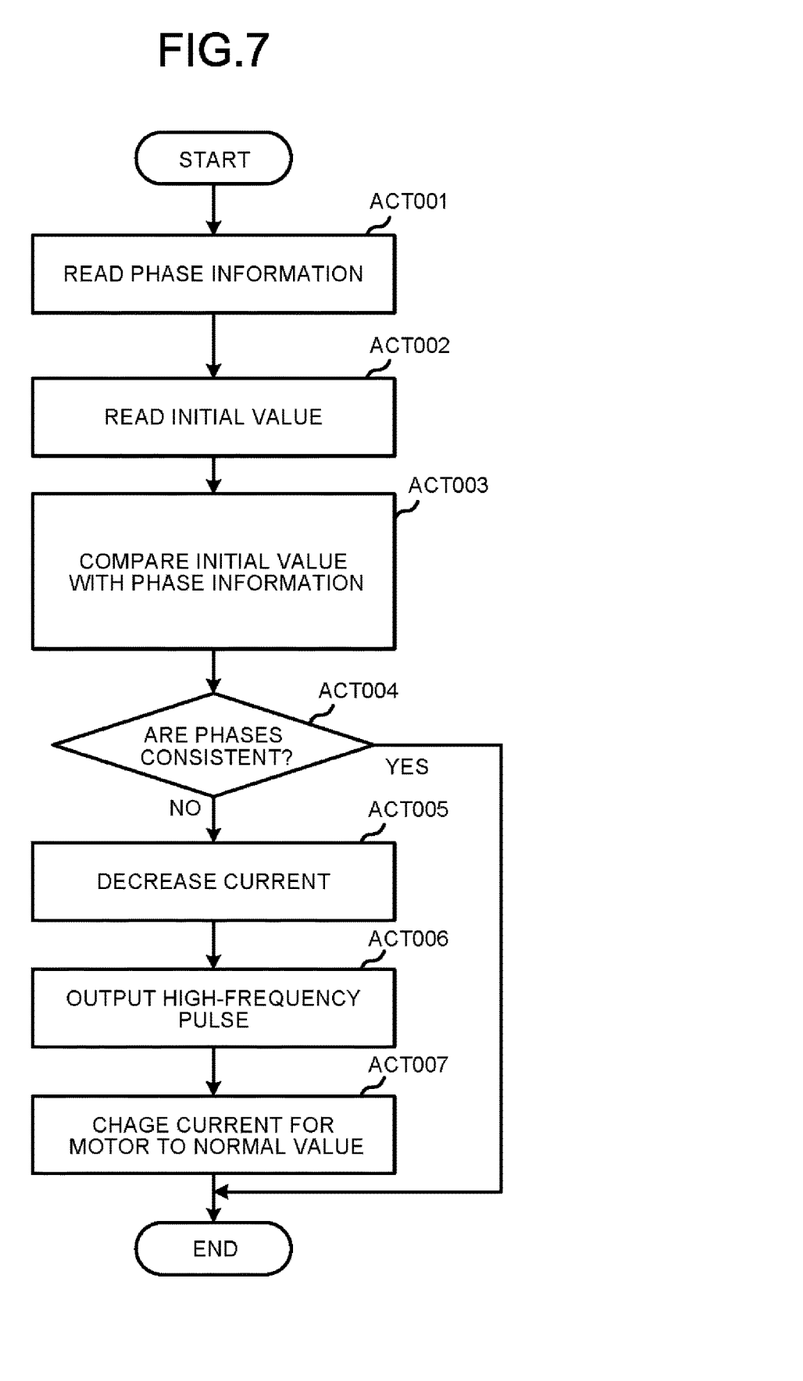
FIG. 7 is a flowchart illustrating an operation example according to an embodiment.

FIG. 7 is a flowchart illustrating an example of operations carried out in the present embodiment when the apparatus resumes from the power-saving mode. The control section 100 acquires, when the apparatus resumes from the power-saving mode, the phase information (the information relating to the rotation phase of the motor 48) stored in the storage section 112 immediately before the apparatus enters the power-saving mode (ACT 001). In the power-saving mode, since the power supply to the control section 100 is not cut off, the storage state of the storage section 112 is maintained. Thus, the phase information is a value representing the phase position of the motor 48 immediately before the motor 48 is stopped. The control section 100 acquires an initial value from the storage section 112 (ACT 002). The initial value is the initial value of the phase information, and is a value when the drive IC 120 starts the management when the apparatus resumes from the power-saving mode. It is set in the example that the initial value, which is defined in advance, is stored in the storage section 112.

The control section 100 compares the phase information immediately before the apparatus enters the power-saving mode acquired in ACT 001 with the initial value acquired in ACT 002 (ACT 003). If the two values are consistent (YES in ACT 004), the processing is ended without carrying out any control operation. On the other hand, if the two values are different (NO in ACT 004), the control section 100 instructs the power control section 150 to decrease the current value of the power supplied to the motor 48 (ACT 005). The power control section 150 decreases the current flowing through the motor 48 according to the instruction. Further, the control section 100 outputs a signal (the first signal) at a high-frequency and a high-speed period which are such a level that the motor 48 is not able to follow until the two values are consistent (ACT 006). According to the high-frequency signal, the drive IC 120 rewrites the phase value managed by itself, without activating the motor 48, to make the phase value consistent with the current phase position of the motor 48. Even in normal operation, the drive IC 120 also rewrites the phase value managed by itself when a pulse signal is input from the control section 100, and outputs the rewritten phase value to the motor 48. Thus, at this time, the operation of the drive IC 120 is the same as that carried out when the drive IC 120 is in normal operation.

After the rewriting is finished, the control section 100 carries out a control to increase the current to a normal current which is capable of driving the motor 48 (ACT 007). Further, the power control section 150 maintains a low current state at least during the period of outputting the first signal to the drive IC 120 at a high frequency. It may be also set that the low current state is continued for a specified time from the apparatus resumes from the power-saving mode. Further, it may be also set that the control section 100 determines whether or not the rewriting is completed, and the current is increased to a normal current based on the determination result.

Figure 8:
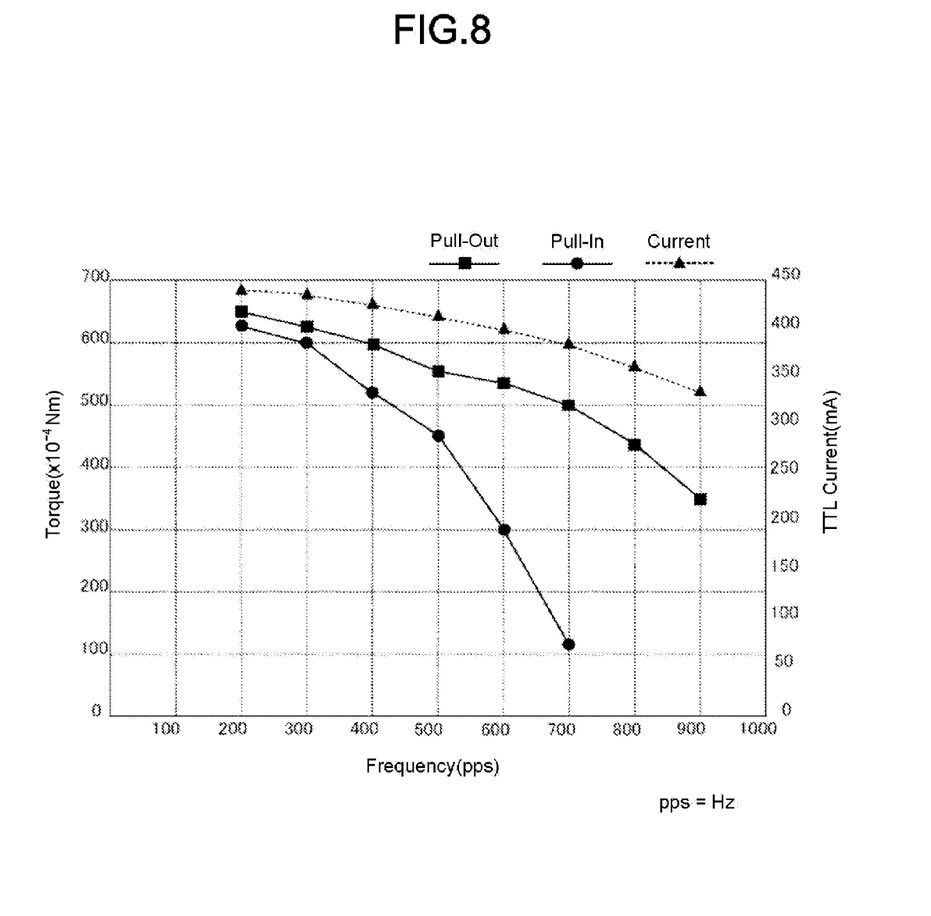
FIG. 8 is a diagram illustrating an example of a data sheet of a motor.

How high the frequency of the output signal should be or how much the current value should be decreased is described herein with reference to FIG. 8. The graph in FIG. 8 shows the specification data of a motor, in this example, the graph is a data sheet illustrating an example of the relation among the torque (10-4 Nm), the rotation frequency (Hz) and the current consumption (mA) of the motor 48. In the data sheet shown in FIG. 8, the upper limit of the rotation frequency of the motor 48 is 900 Hz. Thus, the pulse signal for driving the motor 48 is generally designed to be below 900 Hz. The high-speed pulse signal output in the present embodiment refers to outputting a pulse signal at a frequency higher than three times of the upper limit (900 Hz in the example) of the frequency. Further, this is only an example.

Further, as shown by the value 'Current' shown in the graph of FIG. 8, since there is no record on rotation frequency below 200 Hz in the specification of the motor 48, thus, in order to drive the motor, the rotation frequency of the motor needs to be above 200 Hz. Generally, in the case where the motor 48 is driven to operate, a speed below 200 Hz is not used; even if the motor operates at a speed below 200 Hz, the motor cannot rotate stably due to the vibration. For the motor 48 described in this example, a current of about 450 mA is needed when the motor starts to rotate, that is, when the torque is needed most; in a practical situation, for the sake of a margin, a current of about 600 mA is needed when the motor starts to rotate. In the present embodiment, since there is no need to activate the motor 48, the current value is restricted to be below 450 mA. More specifically, the current value is decreased to less than ⅓ of the current value (450 mA in the example) needed when the motor starts to rotate. Further, this is only an example.

A phase management apparatus incorporated in a sheet processing apparatus is described in the present embodiment; however, the present invention is not limited to this. The phase management apparatus described in the present embodiment may be applied to any motor-using apparatus capable of entering a power-saving mode. Further, as an example, the signal values output from the control section or the drive IC are set to be 1-4, however, it is not limited to this, the signal values may be any values, depending on different situations. Further, the alignment section 36 is described as a control target device in the present embodiment, however, the present invention is not limited to this, control target device may be any device needs to determine accurate position. Further, the stacker 35 or a carriage arranged in the image forming apparatus for maintaining and moving a scanner for scanning an original can be the target device.

As stated above, according to the technology disclosed herein, when the apparatus resumes from a power-saving mode, the phase value managed by the drive IC can be adjusted to be a value consistent with the phase position of the motor, without driving the motor to operate.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A phase management apparatus, comprising:
a control section configured to output a first signal for rotating a motor, wherein the control section outputs the first signal at a first frequency that is higher than a frequency which is necessary for rotating the motor when the apparatus resumes from a power-saving mode, wherein the first frequency has a level that the motor is not able to follow;
a drive circuit configured to store first information indicating a rotation phase of the motor and output a pulse signal to the motor according to the first signal output by the control section, wherein the drive circuit is further configured to update the first information from an initial value to a value of a current rotation phase of the motor according to a received count of the first signal output at the first cycle; and
a power control section configured to carry out a control of supplying power to the control section but not to the drive circuit in a power-saving mode and supplying power to both the control section and the drive circuit in response to the apparatus resuming from the power-saving mode, wherein
the control section comprises a storage section that stores and rewrites the first information indicating the current rotation phase of the motor each time the first signal is output, and
the control section is further configured to
acquire an initial value of the first information indicating the rotation phase of the motor from the storage section in response to the apparatus resuming from the power-saving mode,
acquire another value of the rotation phase of the motor from the first information stored in the storage section immediately before the apparatus enters the power-saving mode, and
when the initial value and the other value are not consistent, output a first signal at the first cycle until the initial value and other value are consistent, and
when the initial value and the other value are consistent, not output the first signal at the first cycle.

2. The phase management apparatus according to claim 1, wherein
the power control section is further configured to control a current flowing through the motor to be a current incapable of driving the motor when the control section outputs the first signal to the drive circuit at the first frequency.

3. A sheet processing apparatus, comprising:
alignment plates configured to align a conveyed sheet bundle;
a motor configured to control positions of the alignment plates;

a control section configured to output a first signal for rotating the motor, wherein the control section outputs the first signal at a first frequency that is higher than a frequency which is necessary for rotating the motor when the apparatus resumes from a power-saving mode, wherein the first frequency has a level that the motor is not able to follow;

a drive circuit configured to store first information indicating a rotation phase of the motor and output a pulse signal to the motor according to the first signal output by the control section, wherein the drive circuit is further configured to update the first information from an initial value to a value of a current rotation phase of the motor according to a received count of the first signal output at the first cycle; and a power control section configured to control a supplying of power to the control section but not to the drive circuit in the power-saving mode and a supplying of power to both the control section and the drive circuit in response to the apparatus resuming from the power-saving mode, wherein the control section comprises a storage section that stores and rewrites the first information indicating the current rotation phase of the motor each time the first signal is output; and the control section is further configured to
acquire an initial value of the first information indicating the rotation phase of the motor from the storage section in response to the apparatus resuming from the power-saving mode,
acquire another value of the rotation phase of the motor from the first information stored in the storage section immediately before the apparatus enters the power-saving mode, and
when the initial value and the other value are not consistent, output a first signal at the first cycle until the initial value and the other value are consistent, and
when the initial value and the other value are consistent, not output the first signal at the first cycle.

4. A phase management method for an apparatus provided with a control section for outputting a first signal for rotating a motor, a drive circuit for storing it information indicating a rotation phase of the motor and outputting a pulse signal to the motor according to the first signal output from the control section, and a power control section for carrying out a control of supplying power to the control section but not to the drive circuit in a power-saving mode and supplying power to both the control section and the drive circuit in response to the apparatus resuming from the power-saving mode, comprising:

outputting a first signal at a first frequency that is higher than a frequency which is necessary for rotating the motor when the apparatus resumes from the power-saving mode, wherein the first frequency has a level that the motor is not able to follow;

updating the first information from an initial value to a value of a current rotation phase of the motor according to a received count of the first signal output at the first cycle;

storing and rewriting, in a storage section, the first information indicating the current rotation phase of the motor each time the first signal is output;

acquiring an initial value of the first information indicating the rotation phase of the motor from the storage section in response to the apparatus resuming from the power-saving mode;

acquiring another value of the rotation phase of the motor from the first information stored in the storage section immediately before the apparatus enters the power-saving mode;

when the initial value and the other value are not consistent, output a first signal at the first cycle until the initial value and the rotation phase indicated by the first information are consistent; and when the initial value and the other value are consistent, not output the first signal at the first cycle.

5. The phase management method according to claim 4, further comprising:
controlling the current flowing through the motor to be a current incapable of driving the motor when the control section outputs the first signal to the drive circuit at the first frequency.

* * * * *